United States Patent
Wang

(10) Patent No.: US 6,178,458 B1
(45) Date of Patent: Jan. 23, 2001

(54) COMMUNICATION INTERFACE FOR AN ELECTRONIC ORGANIZER AND A PERSONAL COMPUTER

(75) Inventor: Jack Y. Y. Wang, Taipei (TW)

(73) Assignee: Tenx Technology, Inc., Taipei (TW)

(*) Notice: Under 35 U.S.C. 154(b), the term of this patent shall be extended for 0 days.

(21) Appl. No.: 08/966,391

(22) Filed: Nov. 7, 1997

(51) Int. Cl.[7] ............................ G06F 13/38; G06F 15/17
(52) U.S. Cl. ........................................ 709/232; 709/239
(58) Field of Search ..................................... 709/232, 239

(56) References Cited

U.S. PATENT DOCUMENTS

| | | | |
|---|---|---|---|
| 4,581,606 | * | 4/1986 | Mallory ................................ 340/539 |
| 4,829,473 | * | 5/1989 | Keller et al. ......................... 364/900 |
| 5,081,711 | * | 1/1992 | Rickman, Jr. ........................ 359/146 |
| 5,296,692 | * | 3/1994 | Shino ................................... 235/486 |
| 5,519,808 | * | 5/1996 | Benton, Jr. et al. ................ 395/2.79 |
| 5,652,789 | * | 7/1997 | Miner et al. ......................... 379/201 |
| 5,666,530 | * | 9/1997 | Clark et al. .......................... 395/617 |
| 5,775,939 | * | 7/1998 | Brown ................................. 439/502 |
| 5,790,958 | * | 8/1998 | McCoy et al. ....................... 455/557 |
| 5,881,317 | * | 3/1999 | Hampsten et al. .................. 395/882 |
| 5,892,503 | * | 4/1999 | Kim .................................... 345/168 |
| 5,896,500 | * | 4/1999 | Ludwig et al. ................. 395/200.34 |

* cited by examiner

*Primary Examiner*—Mark H. Rinehart
*Assistant Examiner*—Stephan Willett
(74) *Attorney, Agent, or Firm*—Stevens, Davis, Miller & Mosher, L.L.P.

(57) ABSTRACT

Communication between a personal computer and an electronic organizer is conducted through the audio input port and the audio output port of the personal computer. The communication interface device of this invention comprises: an output line to be connected with an electronic organizer and the audio input port of the personal computer; an input line to be connected with an electronic organizer and the audio output port of the personal computer; a voltage regulator to regulate voltages of said output line and said input line; and a voltage detector to detect voltage of the audio output port of the personal computer and the input port of the personal computer. The interface device generates control signals to the personal computer and the electronic organizer to enable the communication therebetween when both are ready to communicate.

7 Claims, 6 Drawing Sheets

| command | byte 1 |
|---|---|
| 1. file transfer | 00000110 |
| 2. initializaiton | 01010101 |
| 3. initialization OK | 10101010 |
| 4. flie transfer request | 00000101 |
| 5. ready to receive | 00000100 |
| 6. receive OK | 00000000 |
| 7. checksum error, request to resend | 00000111 |
| 8. communication. error | 00011111 |

Fig. 6

COMMUNICATION INTERFACE FOR AN ELECTRONIC ORGANIZER AND A PERSONAL COMPUTER

FIELD OF THE INVENTION

The present invention relates to a communication interface for an electronic organizer and a personal computer, especially to an interface device enabling the communication between an audio card of a personal computer and an electronic organizer.

BACKGROUND OF THE INVENTION

The electronic organizer (or databank or personal digital assistant—PDA, hereinafter referred to collectively as electronic organizer—is a useful electronic product which is able to store substantially large quantity of personal application information.

FIG. 1 illustrates the system schematics of an electronic organizer. As shown in the figure, an electronic organizer comprises: a microprocessor 1, a memory (RAM/ROM) 2 to store system program, application programs and other information, an LCD display 3 to output (display) information and a keyboard 4 as input device. The microprocessor 1 has a number of data/signal connectors through which signals and data are input or output, according to the specifications of the manufacturer of the microprocessor. In order to communicate with peripherals, the microprocessor shall have at least one "data-in" connector 12 and a "data-out" connector 11.

Due to the limitation of the functions and memory capacity of the electronic organizer, and due to the inconvenience in using the keyboard to input information, the electronic organizer is not capable of processing (operating) a large quantity of data and is not usually used to input a large quantity of data from the keyboard directly, although an electronic organizer is able to store large quantities of data. In general, when it is necessary to process a file stored in an electronic organizer, the file is first dumped to a personal computer and processed in the personal computer and the file so processed is transmitted into the electronic organizer. Similarly, when a large quantity of data is input into an electronic organizer, the data are first input into a personal computer and then transmitted to the electronic organizer. The above-said data-in connector 12 and the data-out connector 11 function as input or output channel for such transmission.

In the conventional art, an electronic organizer communicates with a personal computer through the common communication ports of the personal computer. Suited communication interfaces include an RS-232 port and a PCMCIA port. In order to conduct the communication between a personal computer and its peripherals, it is necessary to provide a special communication interface device. In the conventional art, the communication interface may be classified into three categories, as follows:

The first is the wireless communication interface. In most cases, the communication is conducted with an infrared emitter and a optical sensor. The wireless communication approach includes all kinds of infrared communication interfaces, varying from a high speed IrDA communication interface which speed can be about 4M bit/sec., to a low speed non-standard communication interface. Among them, the IrDA interface provides the function of high speed transmission of information while the manufacturing cost is relatively high. If the CRT display is used as a light emitter, the manufacturing cost may be reduced to half. However, the transmission speed of the CRT display is relatively low (about tenths of a second) and the CRT may not provide the function of two-way transmission.

The second approach is to communicate with an interface card, such as a Personal Computer Memory Card International Association (PCMICIA) card. This approach provides higher transmission speed and larger transmission capacity. Its disadvantages include that a PCMCIA interface is not provided in a desktop personal computer and that the manufacture cost for a PCMCIA card is still relatively high.

The third approach is a line-in communication. The most popular way is through an RS-232 port or a printer port. An electronic organizer may communicate with a personal computer through the RS-232 port or the printer port with a cable with a standard 9 pin or 25 pin adapter. These communication ports are provided in almost every desktop or notebook computer. However, the RS-232 port is always occupied by a mouse or a modem and the printer port by a printer. While RS-232 port or the printer port shall be used, it will be necessary to detach the original adapter and connect the port to the electronic organizer. In the case of the RS-232, due to the fact that the RS-232 port requires dual supply voltages (both positive and negative), additional circuitry must be provided so as to adjust the voltage level of the RS-232 into that acceptable to the logic circuit of the recipient. As for the printer port, although it is a parallel port which provides higher transmission speed, it is not suited to connect with small scale equipment like the electronic organizer because of the large scale of the cable line and the adapter.

Besides the above-mentioned approaches, there are communication interfaces like Ethernet, Universal Serial Bus (USB) etc. These approaches are designed for communications under higher speeds and are not considered suited for the communications between a personal computer and an electronic organizer.

There is need in the industry to provide a simplified communication interface device to enable the communications between a personal computer and an electronic organizer.

There is also a need in the industry to provide a novel communication interface device between an electronic organizer and a personal computer whereby the resources of the personal computer may be used without requiring additional equipment.

OBJECTIVES OF THE INVENTION

One purpose of the invention is to provide a novel communication interface between an electronic organizer and a personal computer.

Another purpose of the invention is to provide a simplified communication interface between an electronic organizer and a personal computer.

Another purpose of the invention is to provide a communication interface between an electronic organizer and a personal computer whereby the resources of the personal computer may be used without requiring additional equipment.

SUMMARY OF THE INVENTION

According to the present invention, the communication between a personal computer and an electronic organizer may be conducted through an audio card. Because the audio card is part of the standard equipment of a personal computer, no additional equipment is required in the personal computer to enable communication with the electronic organizer. The communication interface device of the present invention comprises: an output line to be connected with the data output port of the electronic organizer and the audio input port of the personal computer; an input line to be connected with the data input port of the electronic organizer and the audio output port of the personal computer; a voltage regulator to regulate voltages of said output line and said input line; and a voltage detector to detect voltage of the audio output port of the personal computer and the input port of the personal computer. The interface device generates control signals to the personal computer and the electronic organizer to enable the communication therebetween when both are ready to communicate.

The present invention also discloses the communication processes of the communication interface.

These and other purposes and advantages of the present invention may be clearly understood from the detailed description by referring to the following drawings.

DESCRIPTION OF THE DRAWINGS

FIG. 6 shows the instructions and their contents, as used in the communication interface of this invention.

DETAILED DESCRIPTION OF THE PREFERRED EMBODIMENTS

The following is a detailed description of the communication interface for an electronic organizer and a personal computer of this invention.

Although it is not intended to limit the scope of the present invention, it is found that the audio card (e.g. a sound card) has become standard equipment for the personal computer, especially a multimedia computer. No matter whether the personal computer is a desktop computer or a note book computer, and no matter whether an additional audio card is used, a personal computer will be equipped with a "speaker-out" port and an "MIC-in" port. As these two ports are provided in a personal computer, an electronic may use these ports to communicate with a personal computer.

Figure 1:
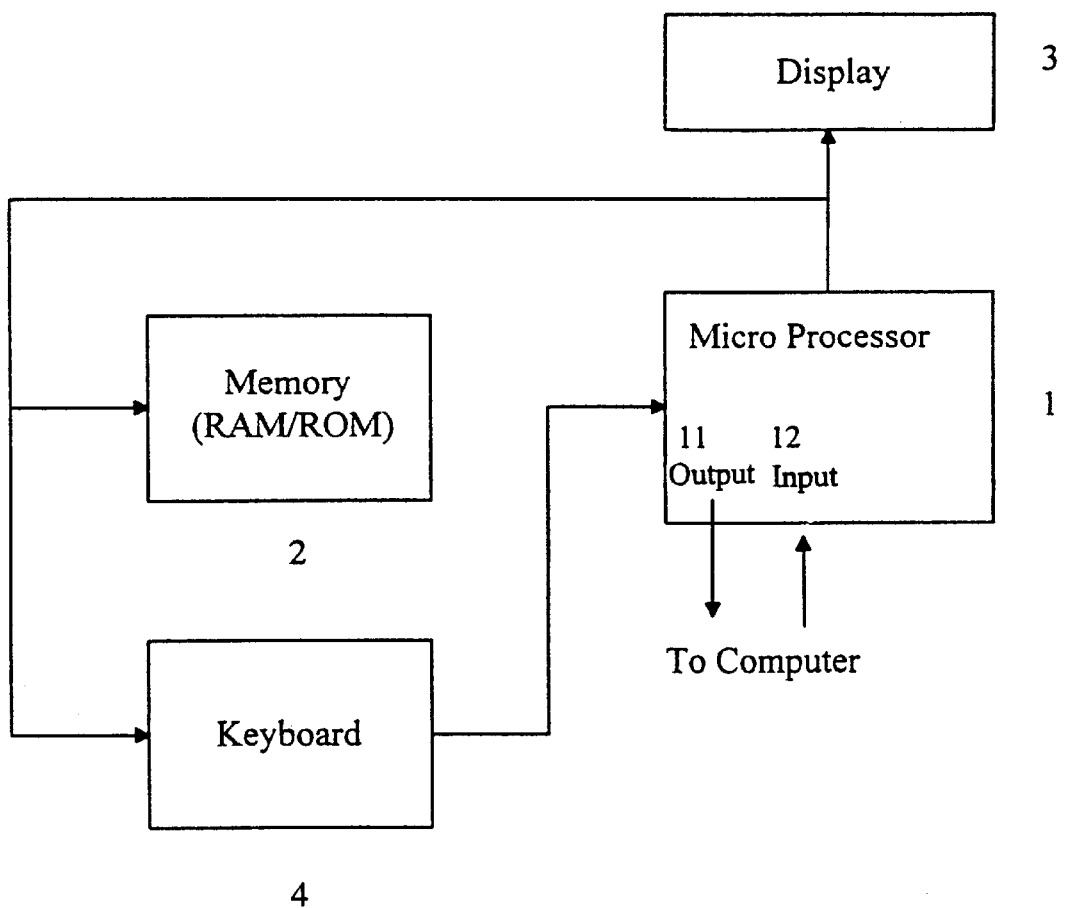
FIG. 1 illustrates the system schematics of an electronic organizer.
Figure 2:
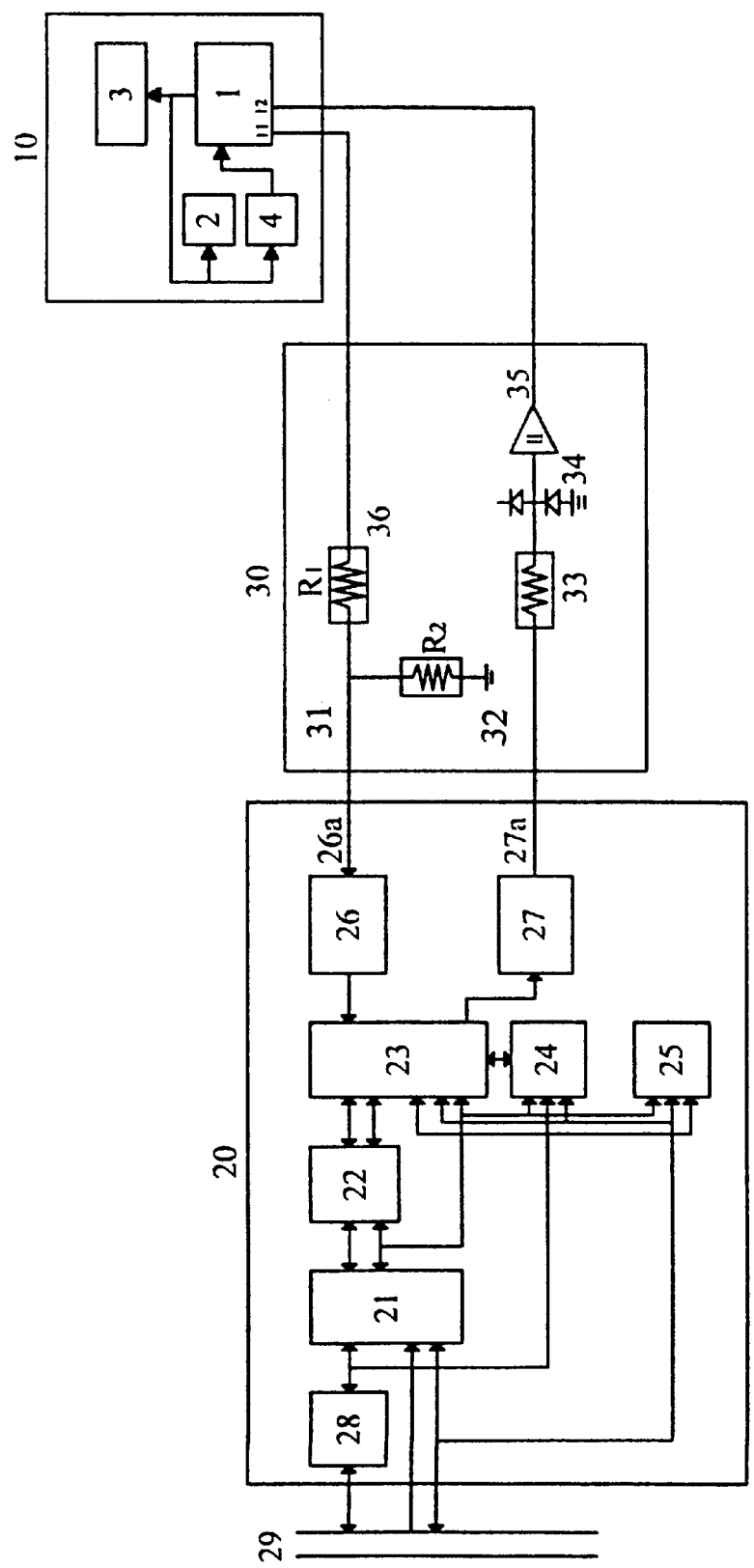
FIG. 2 illustrates the system schematics of the communication interface for an electronic organizer and a personal computer of this invention.

FIG. 2 illustrates the system schematics of the communication interface for an electronic organizer and a personal computer of this invention. In FIG. 2, item 10 represents an electronic organizer. The structure of the electronic organizer 10 is illustrated in FIG. 1 which is a system schematics of an electronic organizer. 20 represents an audio card (or sound card). Item 30 represents the communication interface for an electronic organizer and a personal computer of the present invention.

As shown in FIG. 2, the audio card 20 comprises a controller 21 to control the operations of other components of the audio card 20; a digital audio processor 22 connected with said controller 21 to encode and to decode audio signals; a hybrid signal processor 23 to convert audio signals from different sources into formats acceptable to said digital audio processor 22 and output the converted audio signals to said digital audio processor 22 or a power amplifier 27; a power amplifier 27 to amplify the audio signals output by said hybrid signal processor 23 and output through its "speak-out" connector 27a; a microphone amplifier to accept audio signals from an "MIC-in" connector 26a and to amplify the audio signals and output to said hybrid signal processor 23; an A/D-D/A converter 24 to conduct analog-to-digital or digital-to-analog conversion; and an audio generator 25 to generate sounds with determined frequencies according to related control signal and data.

The transmission of information between said audio card 20 and the data flow 29 of the personal computer is driven by a data flow driver 28. Some data may also be transmitted directly through an address bus or a control bus.

The above is a description of the structure of a conventional audio card. It is not intended to imply that the present invention may not only be applied to the communication between an electronic organizer and a personal computer equipped with a stand-alone or an add-on audio card. The present invention may be applied to the communication between an electronic organizer and a personal computer, if only the personal computer is equipped with an audio input port and an audio output port.

Also shown in FIG. 2, the communication interface 30 comprises: at least one output line 31 to output data and signals from the electronic organizer 10 to the personal computer 20; at least one input line 32 to accept data and signals generated by the personal computer. The output line 31 and the input line 32 may be conventional metal line or cable line with plug diameter for, for example 3.5 mm. The terminals of the lines may be provided with mini plugs. The output line 31 may be connected with the audio-in port 26a (e.g., the MIC-in port) of the personal computer (or its audio card) and the input line 32 may be connected with the audio-out port 27a of the personal computer (or its audio card).

In addition, the interface device 30 may further comprise: a protection resistor 33 connected with said input line 32, a volt regulator 34 to protect the electronic organizer 10 and a Schmidt trigger 35 to avoid malfunctions. A signal attenuator may be connected with the output line 31.

It is founded that in most cases, the power supply of the electronic organizer is a battery with approximately 3 volts. On the other hand, the peak value of the audio output of the personal computer will be about 4–5 volts. It is thus recommended that a regulator may be used to regulate the input voltage of the electronic organizer 10 so that damage caused to the electronic organizer 10 can be prevented. For similar reasons, the output voltage of the electronic organizer 10 shall be regulated to about 0.7 Vrms, so that it is acceptable to the MIC-in port 27a of the personal computer 20.

The communication protocol of the communication interface of this invention may be the conventional RS-232 format and may be negative logical. In practice, either the "full duplex" format or the "half duplex" format may be applied. At the physical layer, it is defined as follows:

"No communication" status: When the voltage at the MIC-in port is 0 v after a predetermined time period (e.g., 10 ms) counting from when the voltage at the speaker-out port has reached a "High" level acceptable to the electronic organizer.

"Ready to communicate" status: When the voltage at the MIC-in port reaches a predetermined level (e.g., 0.7 v) within a predetermined time period (e.g., 10 ms) counting from when the voltage at the speaker-out port has reached a "High" level acceptable to the electronic organizer.

When the system is under the "ready to communicate" status, the personal computer generates an "initialization" instruction. In the embodiments of this invention, all of the instructions are 8 bit long. One "start" bit is added before the 8 bit instruction, and one "stop" bit is added after, making the instruction 10 bits long. The instructions may be single byte or multiple byte. FIG. 6 shows the instructions and their contents, as used in the communication interface of this invention. As shown in the figure, 7 instructions are used in the communication interface of the invention. Among them, only the "file transfer" instruction is a multiple byte instruction. Others are single byte instructions.

When the electronic organizer senses the "initialization" instruction, it generates an "initialization OK" instruction in response. In the embodiment of this invention, the two interactions are "01010101" and "10101010" respectively. These instructions may be used to monitor the synchronization of the communication. Thereafter, the electronic organizer and the personal computer start to transmit or receive data and signals.

During the communication some instruction will be required to reply within a predetermined time period. Failing to receive reply within the time period will be considered a "communication error". The above negotiation will be operated from the beginning.

Figure 3:
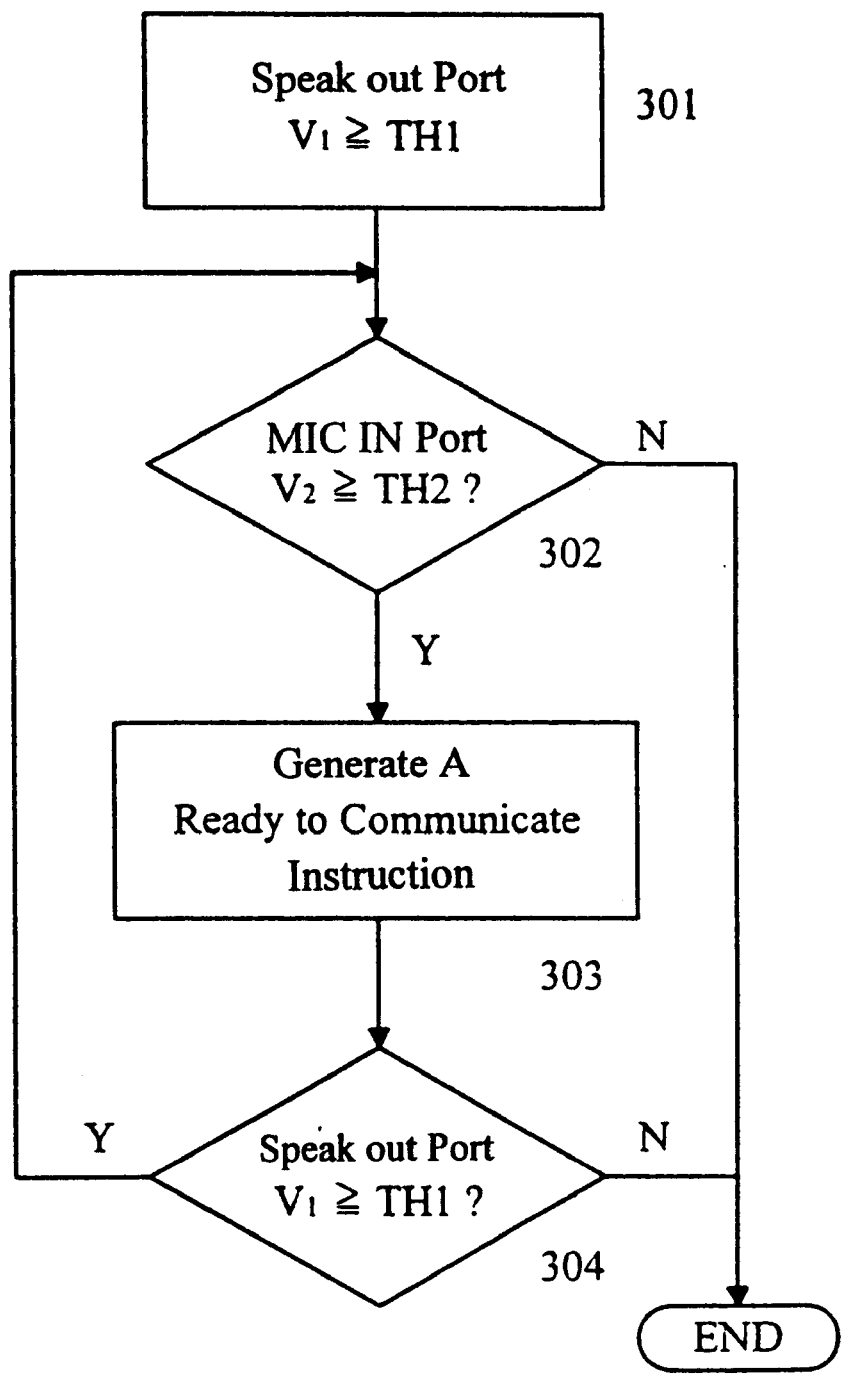
FIG. 3 shows the flow chart of the communication processes of the communication interface for an electronic organizer and a personal computer of this invention.

FIG. 3 illustrates the flow chart of communication processes of the communication interface for an electronic organizer and a personal computer of this invention. As shown in the figure at step 301, when the communication starts, the interface device 30 detects that the voltage at the "speak-out" port 27a of the personal computer has reached a first threshold (threshold 1), and starts to count. At step 302, if the voltage at the "MIC-in" port 26a of the personal computer does not reach a second threshold (threshold 2) within a predetermined time period, the interface device will decide that the status is "no communication" and the loop ends. On the other hand, if the voltage at the "MIC-in" port 26a of the personal computer reaches threshold 2 within the predetermined time period, the interface device will generate a "ready to communicate" instruction at step 303. The personal computer thus generates an "initialization" instruction in response.

After this, the personal computer 20 and the electronic organizer 10 start to communicate with each other, with their respective communication means. The interface device 30 detects the voltage of the "speak-out" port 27a of the personal computer 20 regularly at step 304. If the voltage of the "speak-out" port 27a is maintained at threshold 1, the communication will continue; Otherwise, the interface device 30 stops the communication mode.

Figure 4:
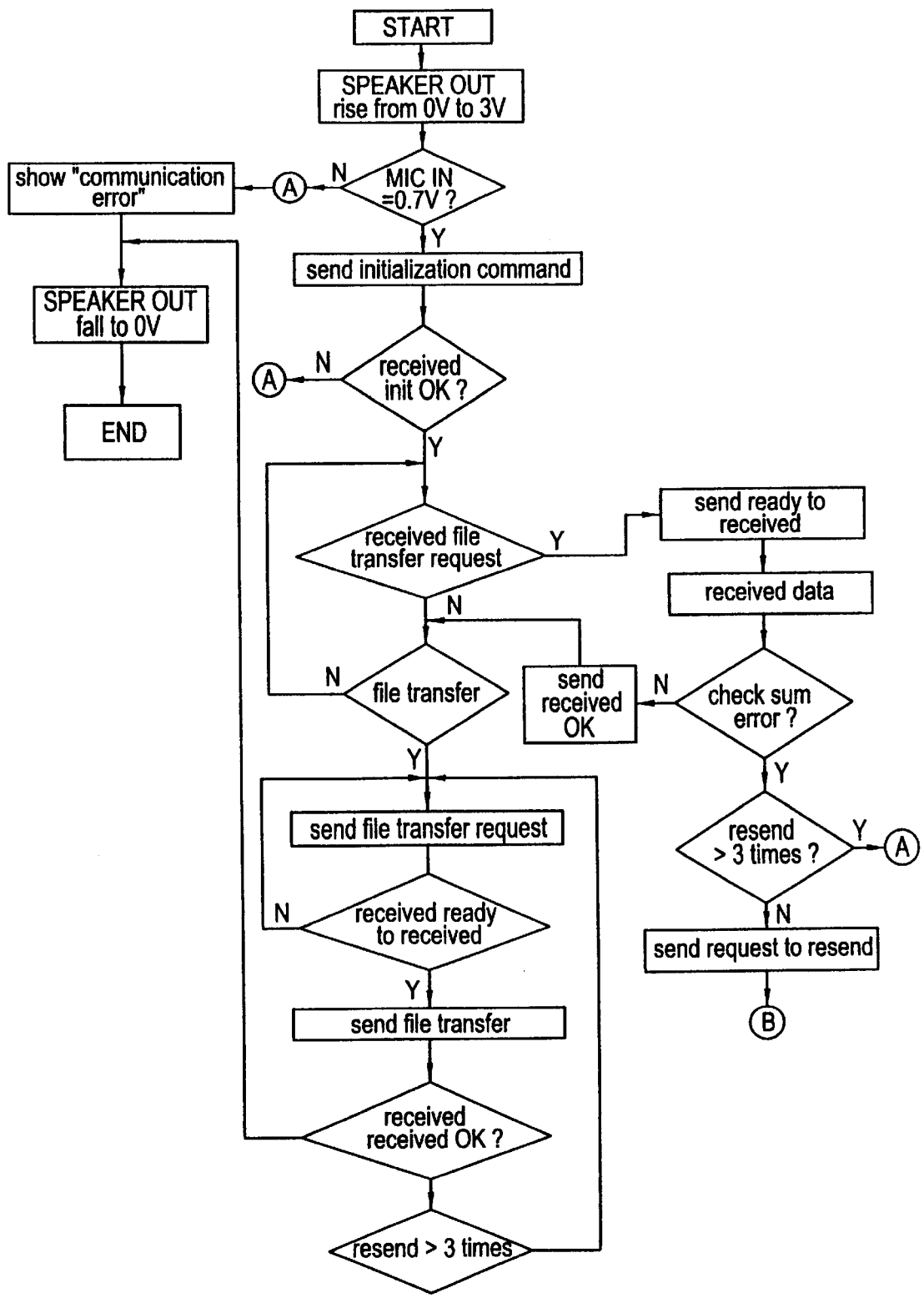
FIG. 4 shows the flow chart of the operation of a personal computer when it communicates with an electronic organizer through the communication interface of this invention.
Figure 5:
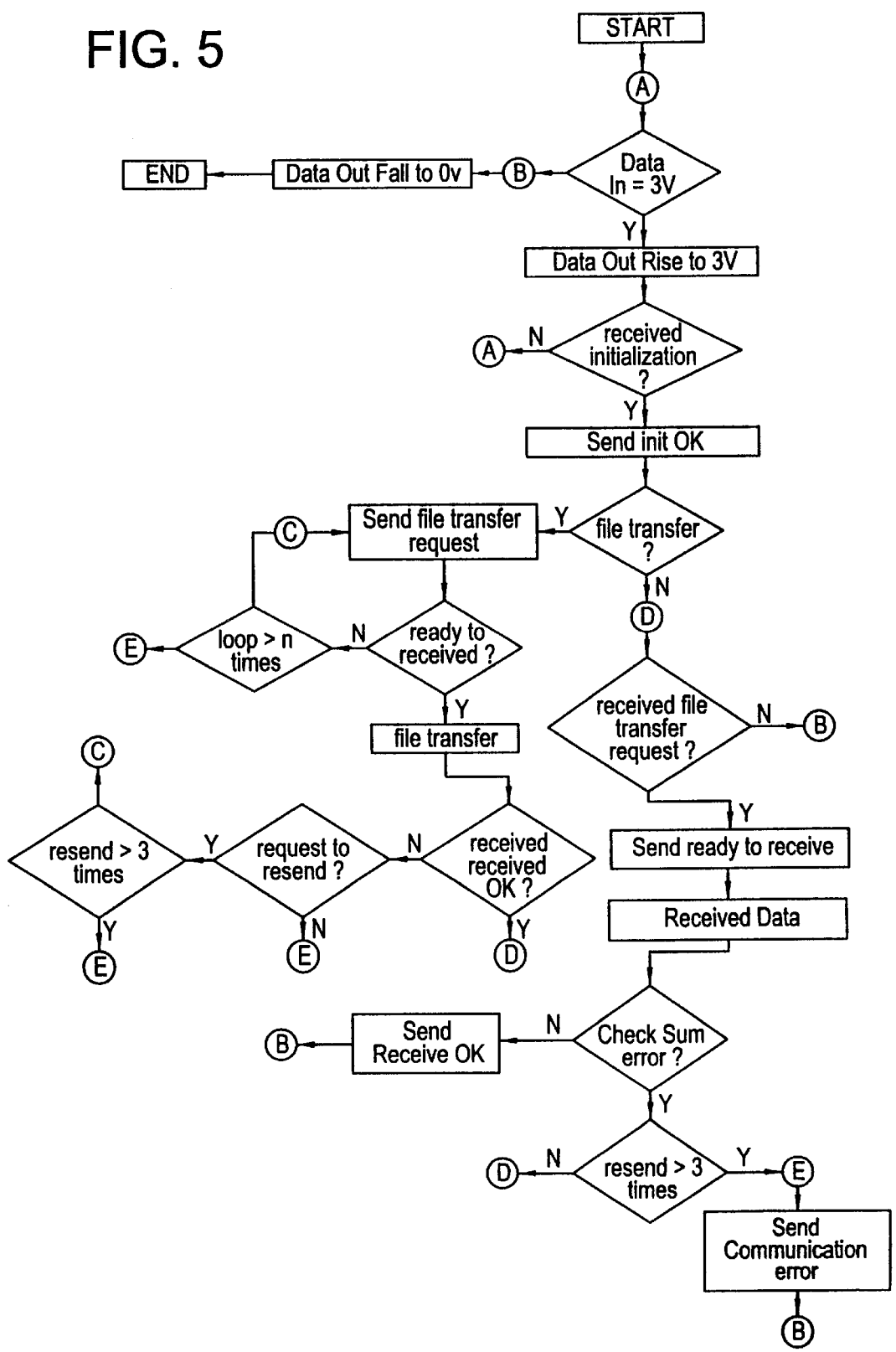
FIG. 5 shows the flow chart of the operation of an electronic organizer when it communicates with a personal computer through the communication interface of this invention.

FIG. 4 shows the flow chart of communication at the audio card of a personal computer and FIG. 5 shows the flow chart of communication at the electronic organizer. These two figures show the processes while the electronic organizer and the personal computer are under the communication mode. As shown in the figures, the processes are same or similar to those in the conventional art. Since the communication between the electronic organizer and the personal computer under the communication mode is not the focus of this invention, detailed description thereof will be omitted.

As the present invention has been shown and described with reference to a preferred embodiment thereof, those skilled in the art will recognize that the above and other changes may be made therein without departing from the spirit and scope of the invention. The scope of the present invention may only be interpreted and limited according to the following claims.

What is claimed is:

1. A non-modulating type communication interface device between an electronic organizer and a personal computer, said personal computer being provided with an audio input port and an audio output port, said communication interface device for enabling communication between said electronic organizer and said audio input port and said audio outport port of said personal computer, without employing a mouse port or a game port of said personal computer, said communication interface device comprising:

an output line with one end for connection with a data output port of said electronic organizer and another end for connection with said audio input port of said personal computer;

an input line with one end for connection with a data input port of said electronic organizer and another end for connection with said audio output port of said personal computer;

a voltage regulating means for regulating unmodulated voltages of said output line and said input line so that said unmodulated voltages are detectable by said electronic organizer and said personal computer.

2. The communication interface device according to claim 1 further comprising a communication control means wherein said communication control means comprises:

a voltage detection and generation means for detecting a voltage for each of said audio output port and said audio input port of said personal computer and for generating a first unmodulated control signal to said personal computer, when the voltage of said audio input port of said personal computer reaches a voltage level $V_2$ within a predetermined time period counting from when the voltage of said audio output port of said personal computer reaches a voltage level $V_1$; and a communication initialization means for generating and providing a second unmodulated control signal to said electronic organizer after receiving a response signal generated by said personal computer in response to said first unmodulated control signal.

3. A non-modulating type communication interface device for unmodulated communication between an electronic organizer and a sound card of a personal computer without employing a mouse port or a game port of said personal computer, comprising:

said sound card including a microphone input port and a speaker output port;

an output line having one end for connection with a data output port of said electronic organizer and another end for connection with said microphone input of said sound card;

an input line having one end for connection with a data input port of said electronic organizer and another end for connection with said speaker output port of said sound card; and means for enabling unmodulated communication voltages between said electronic organizer and said sound card.

4. The communication interface device according to claim 3, wherein:

said means for enabling includes a voltage regulator.

5. The communication interface device according to claim 4, wherein:

said means for enabling includes a Schmidt trigger on said input line.

6. The communication interface device according to claim 3, further comprising:

a current limiting resistor connected in series with said input line.

7. The communication interface device according to claim 3, wherein:

said means for enabling includes a voltage detector for detecting voltages on said output line and said input line.

* * * * *